(12) United States Patent
Guo et al.

(10) Patent No.: US 11,460,001 B2
(45) Date of Patent: Oct. 4, 2022

(54) VARIABLE PITCH MECHANISM AND WIND TURBINE

(71) Applicant: XINJIANG GOLDWIND SCIENCE & TECHNOLOGY CO., LTD., Xinjiang (CN)

(72) Inventors: Yongjun Guo, Beijing (CN); Qian Li, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 230 days.

(21) Appl. No.: 16/612,505

(22) PCT Filed: Oct. 31, 2018

(86) PCT No.: PCT/CN2018/112873
§ 371 (c)(1),
(2) Date: Nov. 11, 2019

(87) PCT Pub. No.: WO2020/000824
PCT Pub. Date: Jan. 2, 2020

(65) Prior Publication Data
US 2021/0332800 A1    Oct. 28, 2021

(30) Foreign Application Priority Data

Jun. 27, 2018  (CN) .......................... 201810679909.2

(51) Int. Cl.
*F03D 7/02* (2006.01)
*F03D 15/00* (2016.01)
*F03D 80/70* (2016.01)

(52) U.S. Cl.
CPC ........... *F03D 7/0224* (2013.01); *F03D 15/00* (2016.05); *F03D 80/70* (2016.05);
(Continued)

(58) Field of Classification Search
CPC .. F03D 7/0224; F03D 7/024; F05B 2260/301; F05B 2260/4031
See application file for complete search history.

(56) References Cited

U.S. PATENT DOCUMENTS

2010/0135808 A1    6/2010  Wiebrock et al.
2011/0142631 A1    6/2011  Kawai et al.
(Continued)

FOREIGN PATENT DOCUMENTS

CN    201757027 U    3/2011
CN    202273806 U    6/2012
(Continued)

OTHER PUBLICATIONS

International Search Report and Written Opinion dated Mar. 26, 2019; PCT/CN2018/112873.
(Continued)

*Primary Examiner* — Christopher R Legendre

(57) ABSTRACT

A variable pitch mechanism for a wind turbine and a wind turbine having the variable pitch mechanism. The variable pitch mechanism includes a variable pitch bearing and a driving gear, the variable pitch bearing includes an outer ring of the bearing fixed to the hub and an inner ring of the bearing connected to the blade, the variable pitch mechanism further includes a flange mounted on the hub, the driving gear is mounted on the flange and engages with the teeth on the inner ring of the bearing, and the mounting position of the flange on the hub is adjustable along a circumferential direction of the variable pitch bearing.

15 Claims, 8 Drawing Sheets

(52) U.S. Cl.
 CPC ..... *F05B 2240/50* (2013.01); *F05B 2260/301* (2013.01); *F05B 2260/4031* (2013.01)

(56) References Cited

U.S. PATENT DOCUMENTS

| | | | |
|---|---|---|---|
| 2013/0243599 A1* | 9/2013 | Pasquet | F03D 80/70 29/889.1 |
| 2014/0328681 A1* | 11/2014 | Garde | F03D 7/0224 416/1 |
| 2014/0341740 A1 | 11/2014 | Pasquet et al. | |
| 2015/0003986 A1 | 1/2015 | Minadeo et al. | |
| 2021/0332800 A1* | 10/2021 | Guo | F03D 7/0224 |

FOREIGN PATENT DOCUMENTS

| | | | |
|---|---|---|---|
| CN | 103842647 A | 6/2014 | |
| EP | 2306002 A2 | 4/2011 | |
| EP | 2574781 A1 | 4/2013 | |
| WO | 2010/045914 A2 | 4/2010 | |

OTHER PUBLICATIONS

The Extended European Search Report dated May 6, 2020; Appln. No. 18909267.9.

* cited by examiner

VARIABLE PITCH MECHANISM AND WIND TURBINE

CROSS REFERENCE TO RELATED APPLICATIONS

The present application is a National Phase entry of PCT Application No. PCT/CN2018/112873, filed on Oct. 31, 2018, which claims the priority to Chinese Patent Application No. 201810679909.2, titled "VARIABLE PITCH MECHANISM AND WIND TURBINE", filed on Jun. 27, 2018, which are incorporated herein by reference in their entireties.

FIELD

The present application relates to the technical field of wind power generation, and in particular to a variable pitch mechanism for a wind turbine and a wind turbine having the variable pitch mechanism.

BACKGROUND

A wind turbine is a large power generation device which converts wind energy into electric energy by rotation of an impeller. The wind turbine uses a variable pitch device to adjust a blade angle based on the change of a wind speed in order to control the impeller to absorb wind energy.

During a normal operation of the wind turbine, when a wind speed exceeds a rated wind speed of the wind turbine, in order to control a power output of the wind turbine, an angle of a blade is controlled between 0 degree and 30 degrees by the variable pitch device for ensuring a speed of the impeller to be limited to a rated range, and the wind turbine may be stopped by the variable pitch device, such as moving the blade to a 90 degrees position.

At present, one commonly used variable pitch structure of the wind turbine is a gear variable pitch. In particular, in this variable pitch structure, an outer ring of a bearing is connected to a hub, an inner ring of the bearing is connected to a root of the blade. A motor and a reducer are installed at a web of the hub, and a driving gear is arranged at an end of an output shaft of the reducer, the driving gear engages with a gear ring of the inner ring of the variable pitch bearing, thus the inner ring of the variable pitch bearing is driven to rotate, which realizes a variable pitch.

However, because the driving gear is usually harder than the variable pitch bearing, the gear ring of the inner ring of the variable pitch bearing is apt to be worn. In addition, if the blade angle is certain when the wind turbine is running, a meshing area between the gear ring of the inner ring of the bearing and the driving gear of the reducer would be fixed, and it is easy to erode and damage a local tooth surface of the gear ring of the inner ring of the bearing and the driving gear of the reducer. During a service period of the wind turbine, when the gear ring is worn and damaged, the blade needs to be removed and the rotor and transmission system need to be disassembled to replace the damaged gear ring, which would be difficult and costly.

SUMMARY

The object of the present application is to provide a variable pitch mechanism and a wind turbine having the variable pitch mechanism, so as to avoid a frequent meshing force in a single meshing area of the gear ring of the bearing or the driving gear of the variable pitch, resulting in the damage of the gear ring of the bearing or the driving gear of the variable pitch during the service period, thus, the maintenance cost of the variable pitch bearing or the gear ring can be reduced.

According to one aspect of the present application, a variable pitch mechanism for the wind turbine is provided, which includes a variable pitch bearing and a driving gear, the variable pitch bearing includes an outer ring of the bearing fixed to the hub and an inner ring of the bearing connected to the blade, an inner circumferential surface of the inner ring of the bearing is provided with teeth, the variable pitch mechanism further includes a flange, and the flange is arranged on the hub, the driving gear is mounted on the flange and engages with the teeth on the inner ring of the bearing, and the mounting position of the flange on the hub is adjustable along the circumferential direction relative to the inner ring of the bearing, thus changing the meshing area between the inner ring of the bearing and the driving gear.

According to one aspect of the present application, the hub includes a web extending radially inward, the flange is mounted on the web and relative to the circumferential direction of the variable pitch bearing, and the flange has a plurality of mounting positions on the web, when the inner ring of the bearing is fixed, the flange may be rotated to any one of the plurality of mounting positions.

According to one aspect of the present application, the variable pitch mechanism includes a radial limit structure, including a seam allowance formed on the web, the inner circumference of the seam allowance cooperates with the periphery of the flange, the radial position of the flange is limited.

According to one aspect of the present application, in the axial direction of the variable pitch bearing, the flange is mounted between the web and the inner ring of the bearing.

According to one aspect of the present application, multiple first through holes are provided on the web, multiple second through holes are arranged on the flange, a fixing bolt passes through one first through hole and one second through hole to secure the flange to the hub, the first through hole is a slotted hole extending along a circumferential direction, and one of the first through holes exposes multiple second through holes.

According to one aspect of the present application, the variable pitch mechanism further includes a circumferential limit structure for limiting the position of the flange in a circumferential direction, the circumferential limit structure includes a positioning key, a plurality of first keyways, and a plurality of second keyways.

The first keyway is arranged on the surface of the web in contact with the flange, and the second keyway is arranged on the surface of the flange in contact with the web, when a first keyway faces a second keyway to form a positioning keyway, the positioning key can be inserted into the positioning keyway from a radial inner side of the flange to limit the circumferential direction of the flange.

According to one aspect of the present application, the variable pitch mechanism further includes a positioning key locking structure, the positioning key locking structure includes a locking bolt, a first locking hole arranged on the web extending axially and in communication with the first keyway, and a second locking hole extending axially on the positioning key, the first locking hole corresponds to the second locking hole, the locking bolt passes through the first locking hole and the second locking hole to lock the positioning key in the positioning keyway, the second locking hole is a threaded hole.

According to one aspect of the present application, an opening is provided on the web, the driving gear engages with the inner ring of the bearing in the position area corresponding to the opening, and the plurality of mounting positions are arranged in the position area.

According to one aspect of the present application, the opening extends a range of 10 degrees to 50 degrees in the circumferential direction of the variable pitch bearing.

According to another aspect of the present application, a wind turbine having a variable pitch mechanism as described above is provided.

The present application provides an embodiment of automatically switching the tooth meshing area without removing and reinstalling driving accessories to replace the meshing area, and the maintenance cost is low.

BRIEF DESCRIPTION OF THE DRAWINGS

The above and other objects and characteristics of the present application will become more clearly in conjunction with the description of the accompanying drawings of one example hereinafter.

DETAILED DESCRIPTION OF EMBODIMENTS

Figure 1:
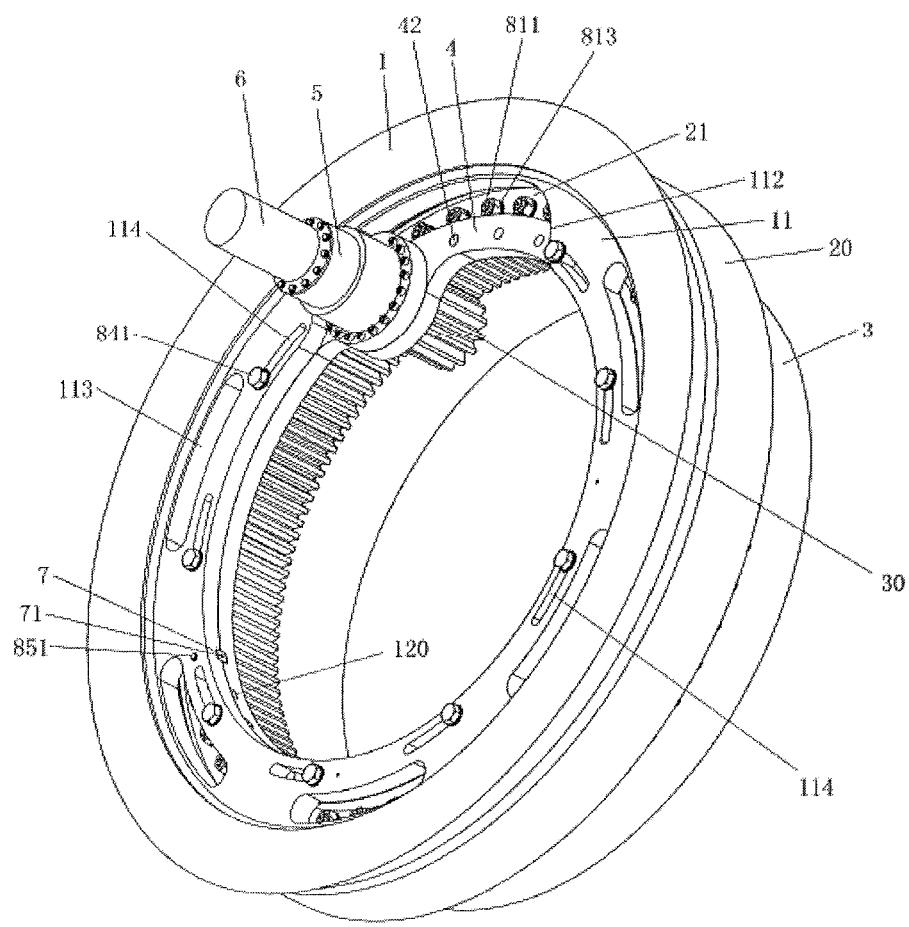
FIG. 1 shows a stereoscopic view of the variable pitch mechanism according to a embodiment of the present application.

A variable pitch mechanism being capable of automatically switching the meshing area of a gear ring is provided in an embodiment of the present application, the variable pitch mechanism is capable of replacing the meshing area without removing and reinstalling the driving accessories. Embodiments of the present application are described in detail with reference to the accompanying drawings hereinafter.

As shown in FIG. 1 to FIG. 5, the variable pitch mechanism according to the embodiment of the present application includes a variable pitch bearing and a variable pitch driving gear 30. The variable pitch bearing includes an inner ring of the bearing 21 and an outer ring of the bearing 20, the outer ring of the bearing 20 is securely mounted on a hub 1 through fixing bolts 801 and nuts 803, a blade 3 is securely mounted on the inner ring 21 of the bearing. Balls 22 are positioned between the inner ring of the bearing 21 and the outer ring of the bearing 20. Teeth are formed on the inner circumference of the inner ring 21 of the bearing, the variable pitch driving gear 30 engages with the teeth of the inner ring 21 of the bearing, and the inner ring of the driving bearing 21 rotates relative to the hub 1, thereby adjusting a blade angle of the blade 3.

The variable pitch mechanism according to the embodiment of the present application further includes a flange 4 mounted on the hub 1. A web 11 is formed on the inside of the hub 1, the flange 4 is mounted on the web 11, a driving motor 6 and a reducer 5 are mounted on the flange 4, and the variable pitch driving gear 30 is mounted at an end of an output shaft of the reducer 5, which maintains a meshing state with the inner ring 21 of the bearing.

Figure 3:
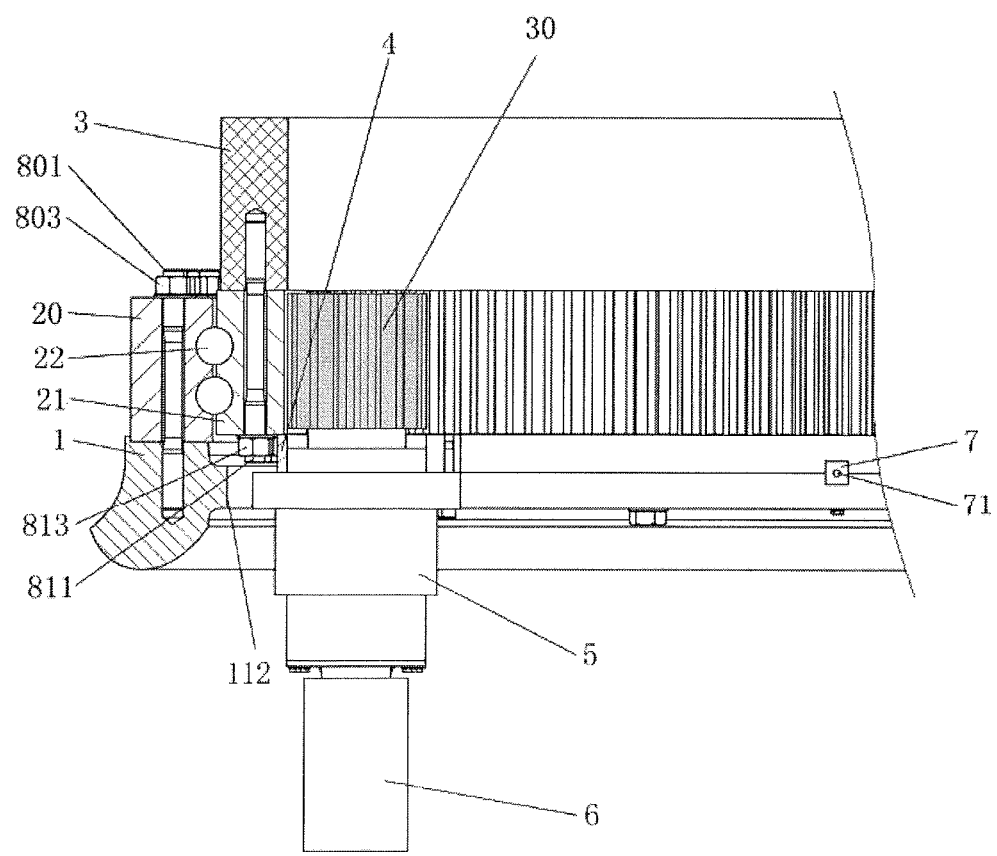
FIG. 3 shows a partial section view of the variable pitch mechanism intercepted along the A-A line of FIG. 2A according to the embodiment of the present application.
Figure 4:
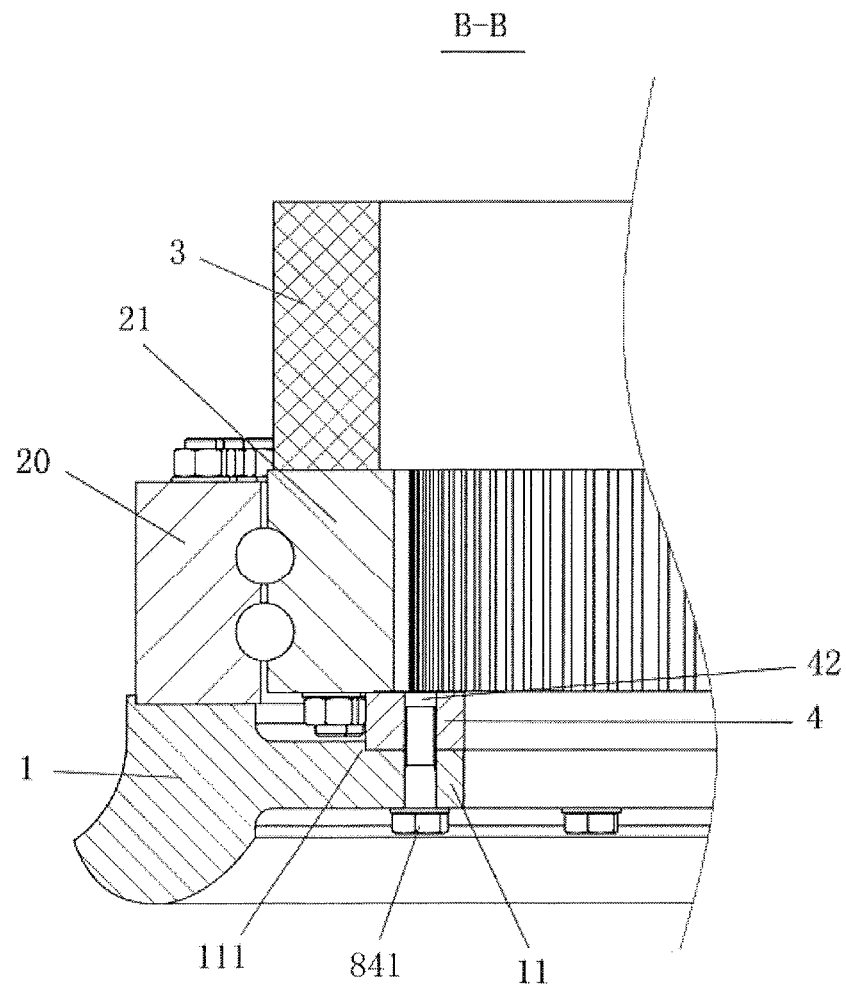
FIG. 4 shows a partial section view of the variable pitch mechanism intercepted along the B-B line of FIG. 2A according to the embodiment of the present application.
Figure 5:
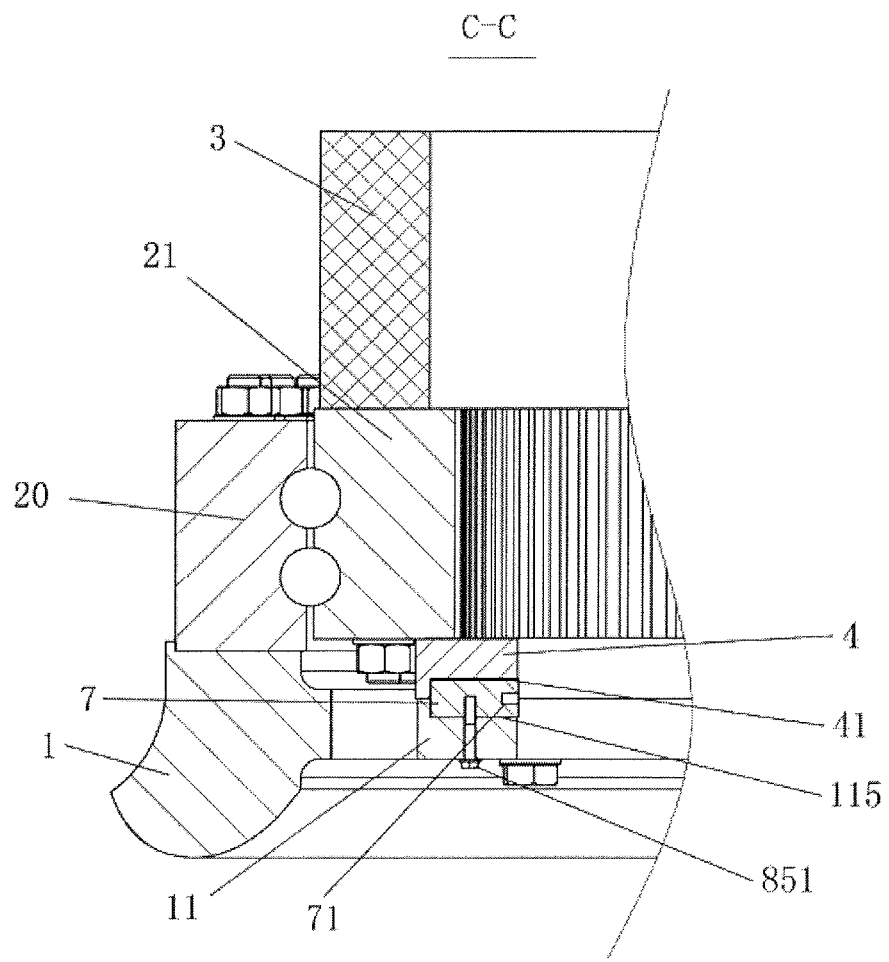
FIG. 5 shows a partial section view of the variable pitch mechanism intercepted along the C-C line of FIG. 2A according to the embodiment of the present application.

Referring to the section views shown in FIGS. 3 to 5, at a mounting hole of the variable pitch bearing, the web 11 extends a predetermined width from the hub 1 in a radial inward direction and has a predetermined distance in an axial direction from an axial end of the inner ring 21 of the variable pitch bearing. The flange 4 is mounted on the web 11. In the axial direction of the variable pitch bearing, the flange 4 is located between the web 11 and the inner ring 21 of the bearing, and the flange 4 is axially limited through the web 11 and the inner ring 21 of the bearing. When the flange 4 is limited only in the axial direction, the flange 4 can rotate in a circumferential direction, so that a mounting position of the flange 4 relative to the inner ring 21 of the bearing can be adjusted in the circumferential direction, thereby the variable pitch driving gear 30 can engage with teeth in different positions of the inner ring 21 of the bearing.

Preferably, the flange 4 is a circular ring, so that the flange 4 is easy to maintain a designed shape and size, is not easy to deform, avoids local stress, and causes uniform force on the inner ring 21 of the bearing. However, the flange 4 may also be a non-integral circular structure, that is, a part of the circular ring in the circumferential direction, if the design conditions are met. When the non-integral circular structure is adopted, an axial and radial positioning of the flange 4 when rotating freely should be guaranteed and the flange of the non-integral circular structure when rotating freely should be prevented from falling off the web 11 of the hub 1 and the inner ring 21 of the bearing.

In order to limit the radial position of the flange 4, a circular seam allowance 111 may be provided on the web 11 (please refer to FIG. 4), so that an outer peripheral surface of the flange 4 is in clearance fit with the inner circumferential surface of the seam allowance 111. When the flange 4 is initially installed, or in the case of removal of other fixed components, the inner circumferential surface of the seam allowance 111 may provide radial positioning of the flange 4.

In order to secure the flange 4 on the web 11, multiple first through holes 114 may be provided on the web 11, multiple second through holes 42 may be provided on the flange 4, and the second through hole 42 is preferably a threaded hole for facilitating bolt installation and disassembly and avoiding axial interference between the fixing bolt 841 and the inner ring 21 of the bearing. The fixing bolt 841 passes through the first through hole 114 and is threaded with the second through hole 42, so as to secure the flange 4 to the web 11 of the hub 1. In order to align the first through hole 114 with the second through hole 42 and facilitate the penetration of the fixing bolt 841, the first through hole 114 may be designed as a slotted hole extending in a circumferential direction. In addition, a first through hole 114 may correspond to multiple second through holes 42 such that multiple second through holes 42 are exposed outwards through the first through hole 114, so as to provide the circumferential positioning of different positions of the flange 4 while facilitating the penetration of the fixing bolt 841.

As shown in FIG. 5, on the surface of the web 11 facing the flange 4, a first keyway 115 is provided from a radial inner side in a radially outward direction, and on the surface of the flange 4 facing the web 11, a second keyway 41 is provided from the radial inner side in a radially outward direction. When the first keyway 115 and the second keyway 41 face each other, a positioning keyway 120 (referring to FIG. 1) is formed, and the positioning key 7 may be inserted into the positioning keyway 120, thus, the flange 4 may be prevented from moving in a circumferential direction relative to the web 11. Multiple first keyways 115 and second keyways 41 may be provided in the circumferential direction, and the number, position and size of the first keyways 115 and second keyways 41 correspond to each other, so as to satisfy the position positioning of different meshing areas. Preferably, the spaces between the multiple first keyways 115 and the second keyways 42 in the circumferential direction need to correspond to a rotation angle when different meshing positions are switched.

In order to keep the positioning key 7 stably in the positioning keyway 120, a positioning key locking structure is further provided. For example, as shown in FIG. 5, in a position corresponding to the positioning keyway 120, a threaded hole penetrating the web 11 is formed on the web 11, and another threaded hole is also formed at the corresponding position of the positioning key 7, a locking bolt 851 is inserted from the axial outward of the web 11 into the positioning key 7 located in the positioning keyway 120, and the positioning key 7 is locked to prevent the positioning key 7 from falling off radially.

In order to facilitate the disassembly of the positioning key 7, a threaded hole 71 is formed at an outer end of the positioning key 7, and the threaded hole 71 extends a predetermined length in a radial direction. When it is necessary to disassemble the positioning key 7, the locking bolt 851 may be disassembled first and then rotated into the threaded hole 71 through a threaded tap, and the positioning key 7 may be pulled out in a radially inward direction.

The driving motor 6 and the reducer 5 are mounted on the flange 4. In order to avoid a conflict between the reducer 5 and the web 11, as shown in FIG. 1, a certain length of opening 112 may be provided in the hub web 11. When the opening 112 is arranged, it needs to avoid a high stress force area of the hub 1 and ensure that the mounting position of the variable pitch driving accessories of the hub 1 does not interfere, the length of the opening 112 (or the circumferential angle of the hub web 11) satisfies that the driving gear 30 of the reducer 5 and the gear ring of the inner ring 21 of the bearing are staggered from a single concentrated force tooth. As an example, the opening 112 may extend in a range of 10 degrees to 50 degrees in the circumferential direction of the variable pitch bearing.

Figure 2A:
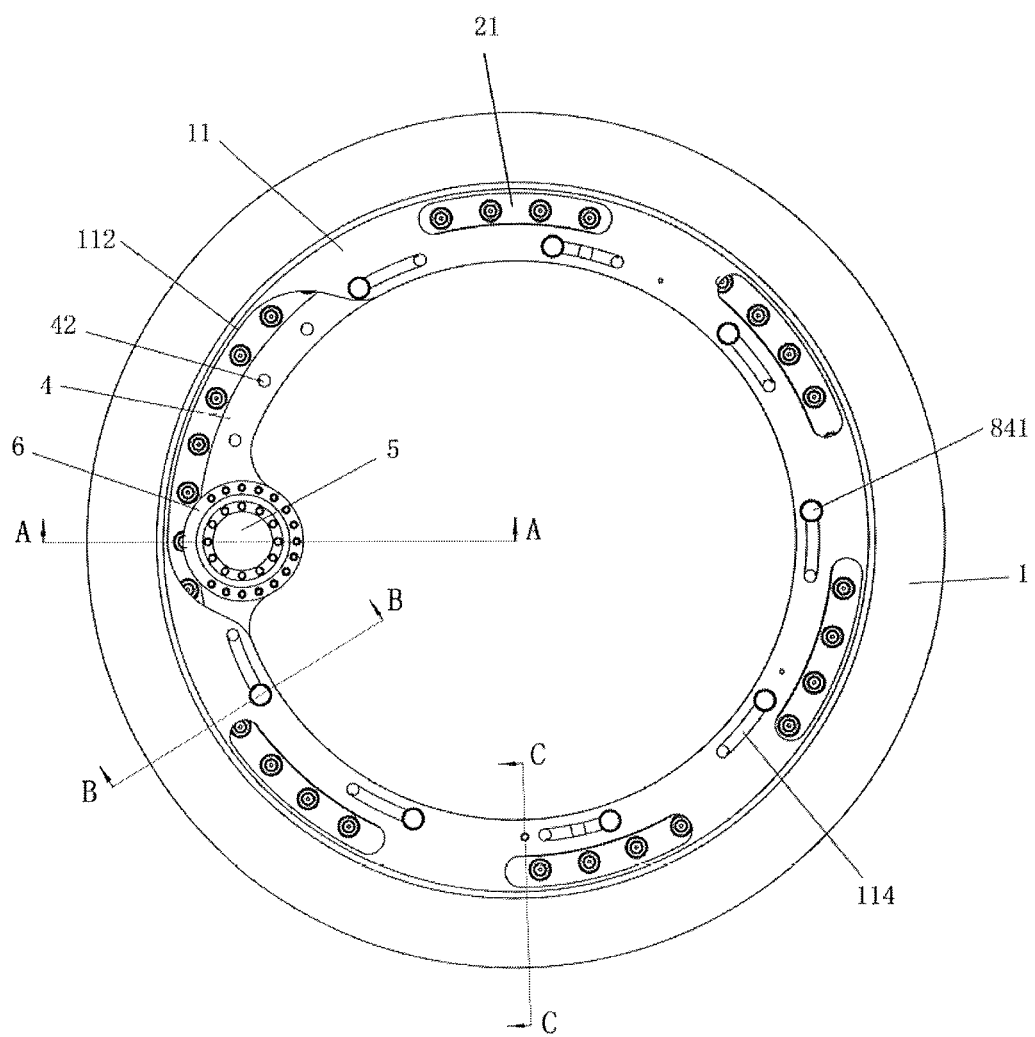
FIGS. 2A and 2B show front views of the variable pitch mechanism according to the embodiment of the present application.
Figure 2B:
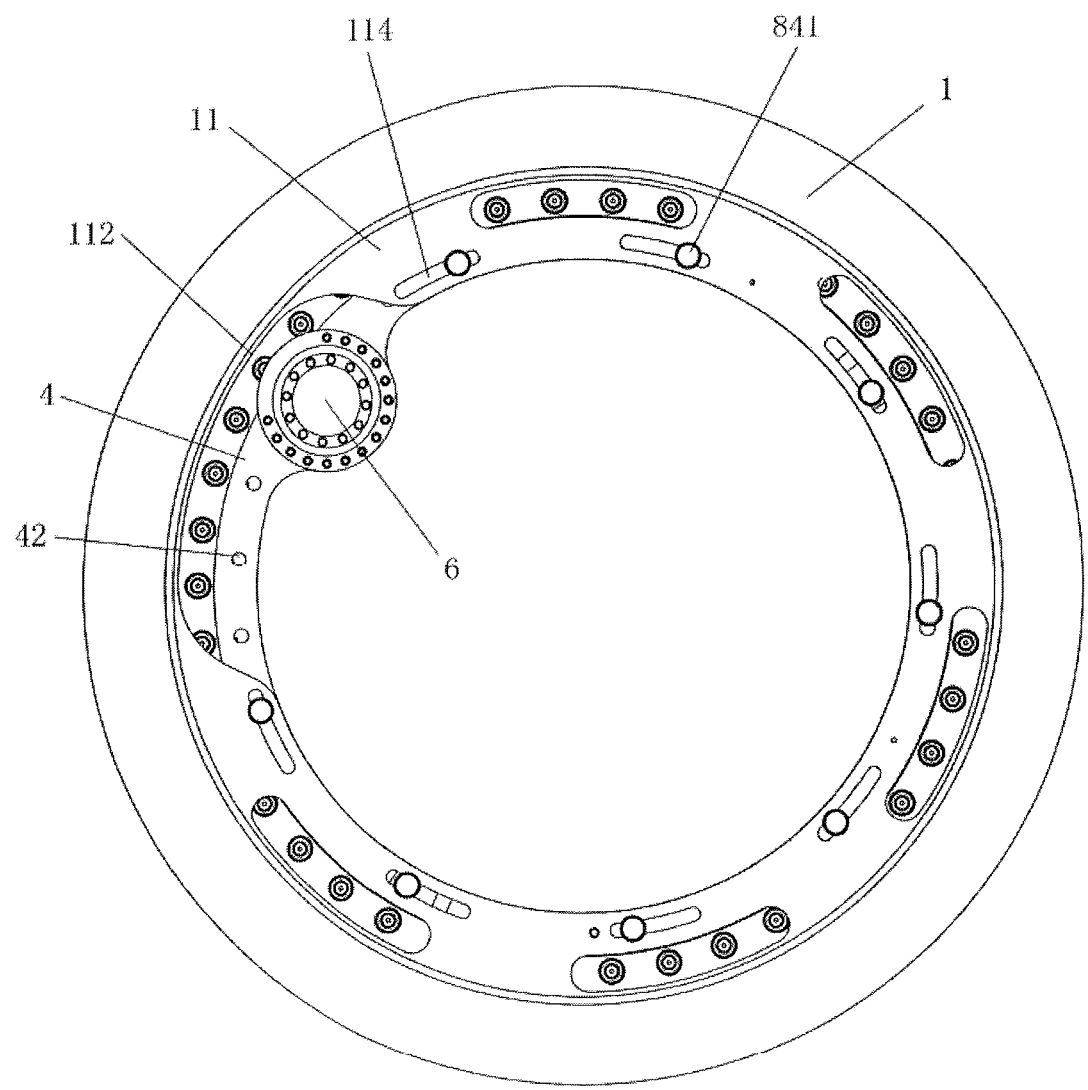

FIGS. 2A and 2B show schematic diagrams of engagement of the variable pitch driving gear with the inner ring 21 of the bearing in the first position and the second position, respectively. As shown in FIG. 2A, the variable pitch driving gear 30 engages with the teeth in the first position of the inner ring 21 of the bearing. When the teeth in the first position are worn to a certain extent, a circumferential limit structure and a radial limit structure may be disassembled, for example, the fixing bolt 841, the locking bolt 851 and the positioning key 7 are disassembled, so that the rotation of the circumferential direction of the flange 4 is unrestricted. The variable pitch driving gear 30 is then driven so that the variable pitch driving gear 30 moves along the inner circumference of the inner ring 21 of the bearing, thus driving the flange 4 to rotate at a certain angle in the circumferential direction, as shown in FIG. 2B, the variable pitch driving gear 30 is staggered from the worn teeth and engaged with the teeth of the inner ring 21 of the bearing in the second position.

Multiple different meshing positions may be provided in the circumferential direction on the flange 4, the space between the different meshing positions satisfies that the variable pitch driving gear 30 is staggered from the meshing teeth on the inner ring 21 of the bearing. The numbers and positions of the first keyway 115 and the second keyway 41 correspond to each other to satisfy the position positioning of switching different meshing areas. For example, when the first position is switched into the second position, the first keyway 115 and the second keyway 41 match correspondingly exactly, so that the positioning key 7 may be inserted. The first through hole 114 on the web 11 and the second through hole 42 on the web 11 need to correspond exactly, so that the fixing bolt 841 is switched to the corresponding second through hole 42 and the flange 4 is re-secured to the web 11.

According to the embodiment of the present application, when the wind turbine is running, based on the assembly and positioning relationship of the components, the positioning key 7 is inserted into the positioning keyway 120 and secured by securing the flange 4 and the hub 1 through fixed bolts 841, the variable pitch motor 6 and the reducer 5 and the variable pitch driving gear 30 are securely mounted on the flange 4. The variable pitch driving gear 30 at the output end of the driving reducer 5 is engaged with the teeth of the inner ring 21 of the bearing. When the variable pitch is needed and the variable pitch motor 6 is started, the inner ring 21 of the bearing is driven by the variable pitch driving gear 30 to rotate a predetermined angle to realize the variable pitch of the blade.

When excessive wear occurs in the meshing portion of the inner ring 21 of the bearing of the variable pitch bearing, the concentrated meshing area of the gear ring is need to change. The impeller of the wind turbine is locked, at the same time, the inner ring 21 of the bearing and the outer ring of the bearing 20 are locked, the fixing bolt 841 between the flange 4 and the hub 1 is disassembled, the positioning key 7 is disassembled, and the variable pitch motor 6 is electrified to drive the variable pitch driving gear 30 at the output end of the driving reducer 5 to rotate. Because the inner ring 21 of the bearing is locked at this time, the variable pitch driving gear 30 drives the flange 4 to rotate during the meshing process between the variable pitch driving gear 30 and the inner ring 21 of the bearing. When the worn meshing area is staggered, the motor 6 is stopped, the positioning key 7 is inserted into the positioning keyway 120, the locking bolt 851 is rotated, and the position of the positioning key 7 is secured. Finally, the fixing bolt 841 is installed in the first through hole 114 and the second through hole 42 on the flange 4, which realizes the securing of the flange 4.

Figure 6:
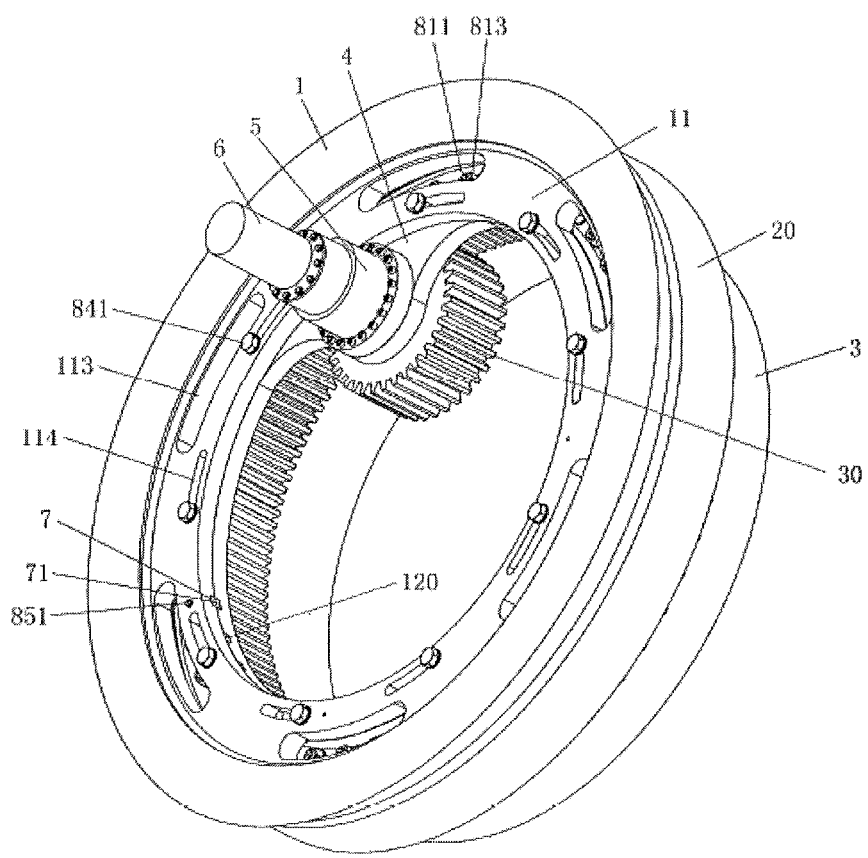
FIGS. 6 and 7 are stereoscopic and main views of the variable pitch mechanism according to another embodiment of the present application respectively.
Figure 7:
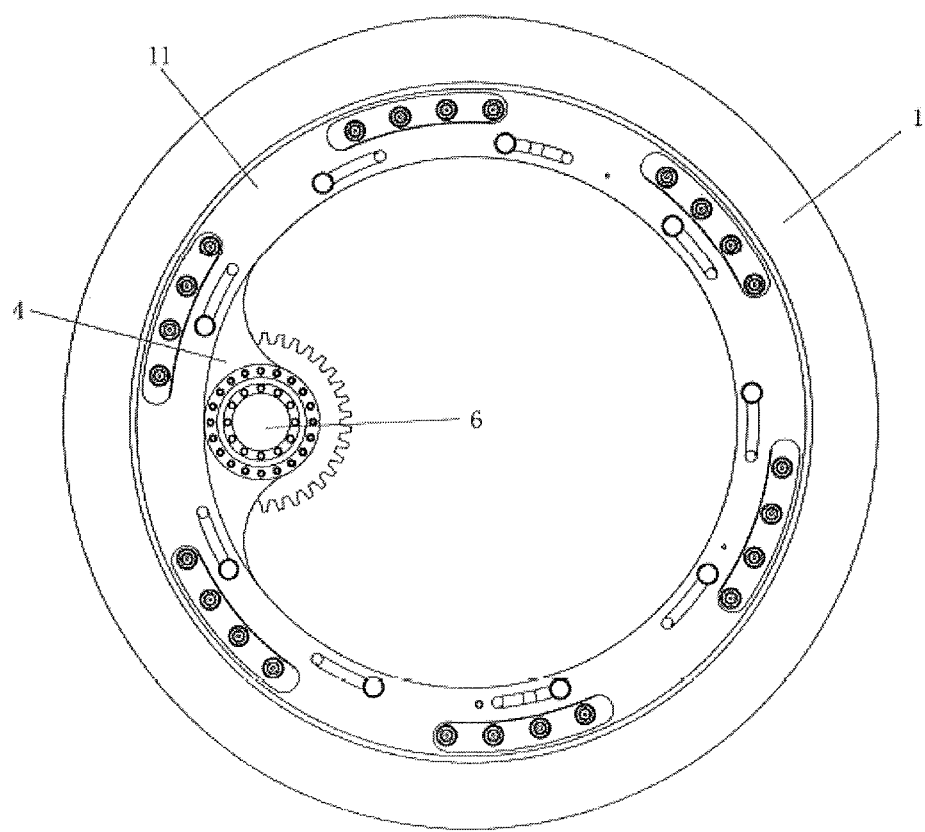

In the example shown in FIGS. 1 to 5, the flange 4 can rotate in a predetermined angle range. However, if the flange 4, the motor 6 mounted on the flange 4, and the reducer 5 are capable of self-rotating a certain stroke and do not interfere with the hub web 11, the opening 112 may not arrange on the web 11, as shown in FIGS. 6 and 7, the motor 6 and the reducer 5 are located on the radial inner side of the hub web 11 and the flange can freely rotated and positioned within 360 degrees, thus the meshing position can be adjusted within an angle range of 360 degrees.

Referring to FIG. 1, the inner ring 21 of the bearing is connected to the root of the blade through fixing bolts 811 and nuts 813. In order to facilitate maintaining the fixing bolt 811, multiple slotted holes 113 extending in the circumferential direction may be provided in the position corresponding to the web 11 and the fixing bolt 811, so that the fixing bolt 811 is exposed outwards. Multiple slotted holes 113 may be evenly distributed in the circumferential direction to provide a maintenance space for the fixing bolt 811 of the root of the blade. Rotating bearings are required for maintenance to expose target maintenance bolts.

According to the technical proposal of the present application, the situation of the replacement and maintenance of the variable pitch bearing caused by the long-term local wear and damage of the bearing ring can be avoided, and the service life and reliability of the bearing gear ring and the variable pitch driving gear ring can be greatly improved.

In the case of occurring local wear of the gear ring, the centralized meshing area of the gear ring can be transformed without disassembling the driving accessories such as the variable pitch motor and the reducer. Therefore, the operation is convenient, simple and low cost.

Although embodiments of the present application have been described in detail in conjunction with the accompanying drawings, it should be understood by those skilled in the art that the present application is not limited by these exemplary embodiments. Various forms of modifications and variants without departing from the spirit and scope of the present application may be made to the present application, which will fall in the scope of protection of the present application.

The invention claimed is:

1. A variable pitch mechanism for a wind turbine, comprising a variable pitch bearing and a driving gear, wherein the variable pitch bearing comprises an outer ring, secured to a hub, and an inner ring, connected to a blade, wherein an inner circumferential surface of the inner ring is provided with teeth,
the variable pitch mechanism further comprises a flange, wherein the flange is a circular ring or part of a circular ring that is coaxial with the variable pitch bearing, and the flange is arranged on the hub, the driving gear is mounted on the flange and engages with the teeth on the inner ring, and the flange is mounted on the hub such that it is adjustable along a circumferential direction relative to the inner ring, thus permitting changing a meshing area between the inner ring and the driving gear,
the hub comprises a web extending radially inward, the flange is mounted on the web along the circumferential direction, and the flange has a plurality of mounting positions on the web, and when the inner ring is secured to a root of the blade, the flange is rotatable to any one of the plurality of mounting positions.

2. The variable pitch mechanism according to claim 1, wherein, the variable pitch mechanism further comprising a radial limit structure, the radial limit structure comprises a seam allowance formed on the web, an inner circumference of the seam allowance cooperates with a periphery of the flange, in order to limit a radial position of the flange.

3. The variable pitch mechanism according to claim 2, wherein, in an axial direction of the variable pitch bearing, the flange is mounted between the web and the inner ring.

4. The variable pitch mechanism according to claim 3, wherein, a plurality of first through holes are provided on the web, a plurality of second through holes are provided on the flange, a fixing bolt passes through each first through hole and each second through hole to secure the flange to the hub,
wherein, each first through hole is a slotted hole extending along the circumferential direction, and one of the first through holes exposes two or more of the plurality of second through holes.

5. A wind turbine, wherein, the wind turbine comprises a rotor having the variable pitch mechanism of claim 4.

6. A wind turbine, wherein, the wind turbine comprises a rotor having the variable pitch mechanism of claim 3.

7. A wind turbine, wherein, the wind turbine comprises a rotor having the variable pitch mechanism of claim 2.

8. The variable pitch mechanism according to claim 1, wherein, the variable pitch mechanism further comprising a circumferential limit structure for limiting a position of the flange in the circumferential direction, the circumferential limit structure comprises a positioning key, a plurality of first keyways, and a plurality of second keyways,
the plurality of first keyways is arranged on a surface of the web in contact with the flange, and the plurality of second keyways is arranged on a surface of the flange in contact with the web, when one first keyway faces one second keyway of the plurality of second keyways to form a positioning keyway, the positioning key is inserted into the positioning keyway from a radial inner side of the flange to limit movement along the circumferential direction of the flange.

9. The variable pitch mechanism according to claim 8, wherein, the variable pitch mechanism further comprises a positioning key locking structure, the positioning key locking structure comprises a locking bolt, a first locking hole arranged on the web extending axially and in communication with one of the plurality of first keyways, and a second locking hole extending axially on the positioning key, the first locking hole corresponds to the second locking hole, the locking bolt passes through the first locking hole and the second locking hole to lock the positioning key in the positioning keyway, wherein, the second locking hole is a threaded hole.

10. A wind turbine, wherein, the wind turbine comprises a rotor having the variable pitch mechanism of claim 9.

11. A wind turbine, wherein, the wind turbine comprises a rotor having the variable pitch mechanism of claim 8.

12. The variable pitch mechanism according to claim 1, wherein, an opening is provided on the web, the driving gear engages with the inner ring in a position area corresponding to the opening, and the plurality of mounting positions are arranged in the position area.

13. The variable pitch mechanism according to claim 12, wherein, the opening extends a range of 10 degrees to 50 degrees in the circumferential direction of the variable pitch bearing.

14. A wind turbine, wherein, the wind turbine comprises a rotor having the variable pitch mechanism of claim 12.

15. A wind turbine, wherein, the wind turbine comprises a rotor having the variable pitch mechanism of claim 1.

* * * * *